(12) United States Patent
Matsuo

(10) Patent No.: US 11,891,089 B2
(45) Date of Patent: Feb. 6, 2024

(54) REMOTE ASSIST SYSTEM AND REMOTE ASSIST METHOD OF AUTOMATED DRIVE VEHICLES

(71) Applicant: TOYOTA JIDOSHA KABUSHIKI KAISHA, Toyota (JP)

(72) Inventor: Yoshiaki Matsuo, Izunokuni (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 17/582,093

(22) Filed: Jan. 24, 2022

(65) Prior Publication Data

US 2022/0234619 A1 Jul. 28, 2022

(30) Foreign Application Priority Data

Jan. 26, 2021 (JP) ................................ 2021-010594

(51) Int. Cl.
*B60W 60/00* (2020.01)
*G08G 1/09* (2006.01)
*G08G 1/095* (2006.01)

(52) U.S. Cl.
CPC ......... *B60W 60/0015* (2020.02); *G08G 1/095* (2013.01); *B60W 2420/42* (2013.01); *B60W 2520/04* (2013.01); *B60W 2555/60* (2020.02); *B60W 2556/45* (2020.02)

(58) Field of Classification Search
CPC ......... B60W 60/0015; B60W 2420/42; B60W 2520/04; B60W 2555/60; B60W 2556/45; G08G 1/095; G08G 1/096725; G08G 1/09675; G08G 1/096783; G05D 1/0038; G05D 2201/0213; G05D 1/024; G05D 1/0214; G05D 1/0246
See application file for complete search history.

(56) References Cited

U.S. PATENT DOCUMENTS

| 2019/0283752 A1 | 9/2019 | Yanagihara et al. |
| 2019/0286926 A1 | 9/2019 | Miura et al. |
| 2021/0276594 A1* | 9/2021 | Oh .......................... H04W 4/44 |

FOREIGN PATENT DOCUMENTS

| JP | 2019-036100 A | 3/2019 |
| JP | 2019-156192 A | 9/2019 |
| JP | 2019-156196 A | 9/2019 |

* cited by examiner

*Primary Examiner* — Rodney A Butler
(74) *Attorney, Agent, or Firm* — Sughrue Mion, PLLC

(57) ABSTRACT

A vehicle determines whether or not a passage permit condition of the vehicle according to an instruction content of a traffic light in front of the vehicle is satisfied. If it is determined that the passage permit condition is not satisfied, the vehicle temporally stops in front of the traffic light and transmits an assist requiring signal to a remote facility. A display device of the remote facility displays reference image information indicating shot image information of the vehicle that temporally stops in front of the traffic light. An operator of the remote facility inputs positional information of pixels that make up the traffic light contained in the reference image information. The remote facility transmits assist information including the positional information to the vehicle. Based on the positional information, the vehicle determines again whether or not the passage permit condition is satisfied.

4 Claims, 7 Drawing Sheets

REMOTE ASSIST SYSTEM AND REMOTE ASSIST METHOD OF AUTOMATED DRIVE VEHICLES

CROSS-REFERENCE TO RELATED APPLICATION

The present application claims priority under 35 U.S.C. § 119 to Japanese Patent Application No. 2021-010594, filed Jan. 26, 2021, the contents of which application are incorporated herein by reference in their entirety.

TECHNICAL FIELD

The present disclosure relates to a system and a method to assist automated driving of automated drive vehicles.

BACKGROUND

JP2019-156192A discloses a controller of a vehicle to perform automated driving in a one-side alternate section. When a construction is conducted in one of a two-way road, the one-side alternate section is provided to ensure vehicle traffic across this construction section. Based on images acquired by a camera, the conventional controller recognizes the presence of the construction section and installations that are specific to the construction section. The installations include a construction vehicle, a triangle cone, and a provisional traffic light.

Usually, the provisional traffic light is placed in front of the construction section. The conventional controller judges whether or not the vehicle is able to pass through the one-side alternate section based on information indicated by the provisional traffic light (e.g., displayed colors, time to displaying green light). If the provisional traffic light is not recognized by the controller, it is judged whether or not the vehicle is able to pass based on other information. Examples of the other information include a movement of a traffic guide person and a behavior of a preceding vehicle. If such information is not recognized, the controller executes control to prompt a manual driving by a driver of the vehicle.

The reason why the provisional traffic light is not recognized is that it is difficult for the vehicle to grasp the location of the provisional traffic light on a map, and therefore, it is difficult to recognize it on a camera image as compared with the camera image on a permanent traffic light. This cognitive problem also applies to a traffic light installed on a private property (e.g., a parking facility of a commercial facility).

Therefore, a case is considered in which a recognition accuracy of an instruction content of the traffic light that exists in front of the vehicle is low and a recognition assist of the instruction content is requested to an operator in a remote facility. In this case, the vehicle transmits a signal to the remote facility for requesting the recognition assist while pausing in front of the traffic light. Upon the transmission of this signal, the image information of the camera mounted on the vehicle is provided to the operator. Therefore, the operator easily recognizes the instruction content of the traffic light. The operator then enters a passage permitting signal into a computer according to the instruction content of the traffic light. This passage permitting signal is transmitted from the remote facility to the vehicle.

However, a communication delay occurs depending on a transmission rate in a communication line and a distance from the remote facility to the vehicle. Therefore, at a timing at which the vehicle receives the passage permitting signal, or at a timing at which the vehicle starts based on this passage permitting signal, there is a possibility that the instruction content of the traffic light is changed to a content which is undesirable for the passage of the vehicle. Therefore, an improvement for appropriately coping with such a change in the instruction content is required.

One object of the present disclosure is to provide a technique capable of safely driving a vehicle based on real-time information of the instruction content when the recognition assist of the instruction content of the traffic light that exists in front of the vehicle is performed.

SUMMARY

A first aspect of the present disclosure is a remote assist system of vehicles and has the following features.

The remote assist system comprises a vehicle configured to perform an automated driving, and a remote facility configured to communicate with the vehicle.

The vehicle comprises a controller configured to execute automated driving control of the vehicle based on driving environment information including shot image information in front of the vehicle.

The remote facility comprises an input device, a display device, and an information processing device. The input device is operated by an operator. The display device configured to display the shot image information. The information processing device configured to execute input information processing to process input information received by the input device, and display control processing of the display device.

In the automated driving control, the controller is configured to:
  determine, based on the driving environment information, whether or not a passage permit condition of the vehicle according to an instruction content of a traffic light that exists in front of the vehicle is satisfied;
  if it is determined that the passage permit condition is not satisfied, execute vehicle control to stop the vehicle temporally in front of the traffic light; and
  transmit an assist requesting signal for requesting an assist by the operator to the remote facility.

The information processing device is configured to:
  when receiving the assist requiring signal, execute processing to display reference image information indicating the shot image information during the temporal stop of the vehicle; and
  when receiving, as the input information, positional information of pixels constituting the traffic light included in the reference image information, transmit to the vehicle assist information including the positional information in the input information processing.

In the automated driving control, the controller is further configured to:
  when receiving the assist information, determine whether or not the passage permit condition of the vehicle based on the received assist information; and
  if it is determined that the passage permit condition is satisfied, execute vehicle control in which the temporarily stop of the vehicle is released and the vehicle is controlled to travel in accordance with the instruction content of the traffic light.

A second aspect of the present disclosure further has the following features in the first aspect.

The information processing device is configured to, when receiving as the input information the passage permitting signal of the vehicle, transmit to the vehicle the assist information including the passage permitting signal.

In the automated driving control, the controller is further configured to:
  if it is determined that the passage permit condition is satisfied after receiving the passage permitting signal, execute the vehicle control in which the temporarily stop of the vehicle is released and the vehicle is controlled to travel in accordance with the instruction content of the traffic light.

A third aspect of the present disclosure is a remote assist method of vehicles in which automated driving of the vehicles is remotely assisted, and has the following features.

In the remote assist method,
  a controller of a vehicle executes automated driving control of the vehicle based on driving environment information including shot image information in front of the vehicle,
  an information processing device of a remote facility configured to communicate with the vehicle executes input information processing to process input information received by the input device and executes display control processing of a display device to display the shot image information thereon.

In the automated driving control, the controller is configured to:
  determine, based on the driving environment information, whether or not a passage permit condition of the vehicle according to an instruction content of a traffic light that exists in front of the vehicle is satisfied;
  if it is determined that the passage permit condition is not satisfied, execute vehicle control to stop the vehicle temporally in front of the traffic light; and
  transmit an assist requesting signal for requesting an assist by the operator to the remote facility.

The information processing device is configured to:
  when receiving the assist requiring signal, execute processing to display reference image information indicating the shot image information during the temporal stop of the vehicle; and
  when receiving, as the input information, positional information of pixels constituting the traffic light included in the reference image information, transmit to the vehicle assist information including the positional information in the input information processing.

In the automated driving control, the controller is further configured to:
  when receiving the assist information, determine whether or not the passage permit condition of the vehicle based on the received assist information; and
  if it is determined that the passage permit condition is satisfied, execute vehicle control in which the temporarily stop of the vehicle is released and the vehicle is controlled to travel in accordance with the instruction content of the traffic light.

A fourth aspect of the present disclosure further has the following features in the third aspect.

The information processing device is configured to, when receiving as the input information the passage permitting signal of the vehicle, transmit to the vehicle the assist information including the passage permitting signal.

In the automated driving control, the controller is further configured to:
  if it is determined that the passage permit condition is satisfied after receiving the passage permitting signal, execute the vehicle control in which the temporarily stop of the vehicle is released and the vehicle is controlled to travel in accordance with the instruction content of the traffic light.

According to the first or third aspect, the assist information is provided from the remote facility to the vehicle in response to the assist requiring signal even when a recognition accuracy of the instruction content of the traffic light is low. The assist information includes the positional information of the pixels that constitute the traffic light contained in the shot image information (the reference image information) during the temporal stop of the vehicle. Therefore, it is possible to improve the situation in which the recognition accuracy of the instruction content of the traffic light is low. Therefore, it is possible for the vehicle to recognize real-time information of the instruction content of the traffic light thereby the passage permit condition can be determined by the vehicle. Therefore, it is possible to enhance driving safety of the vehicle in accordance with the instruction content of the traffic light.

According to the second or fourth aspect, even when the assist information including passage permitting signal is provided to the vehicle, it is possible for the vehicle to recognize the real-time information of the instruction content of the traffic light thereby the passage permit condition can be determined by the vehicle.

DESCRIPTION OF EMBODIMENT

Figure 1:
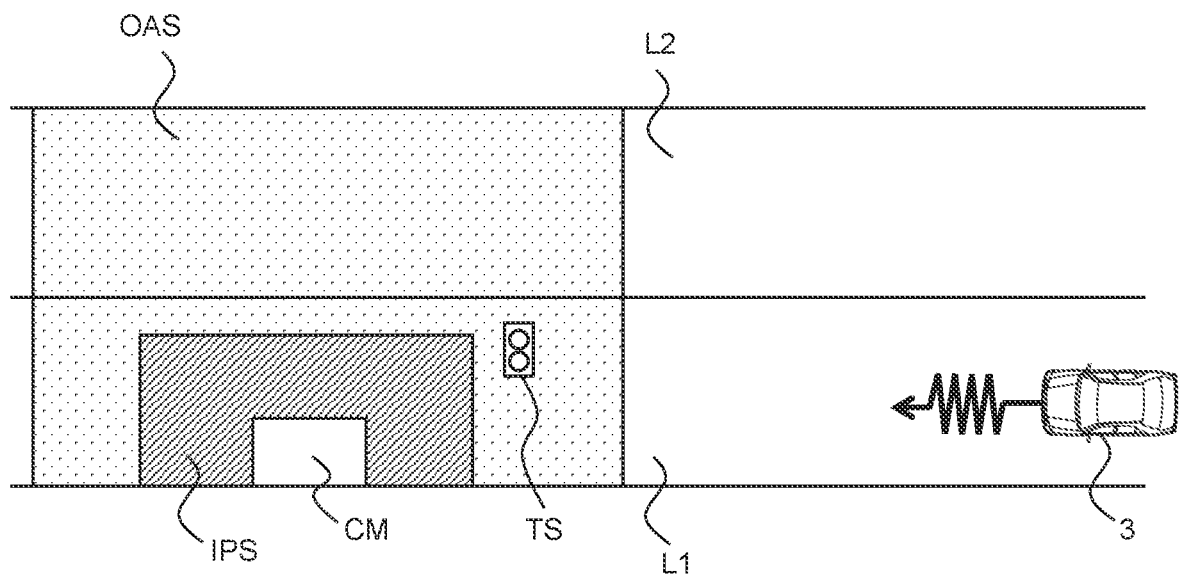
FIG. 1 is a diagram for explaining an outline of an embodiment of the present disclosure.

An embodiment of the present disclosure will be described below with reference to the drawings. A remote assist method according to the embodiment is realized by computer processing executed in a remote assist system according to the embodiment. In the drawings, same or corresponding portions are denoted by the same sign, and descriptions thereof are simplified or omitted.

1. Outline of Embodiment

Figure 2:
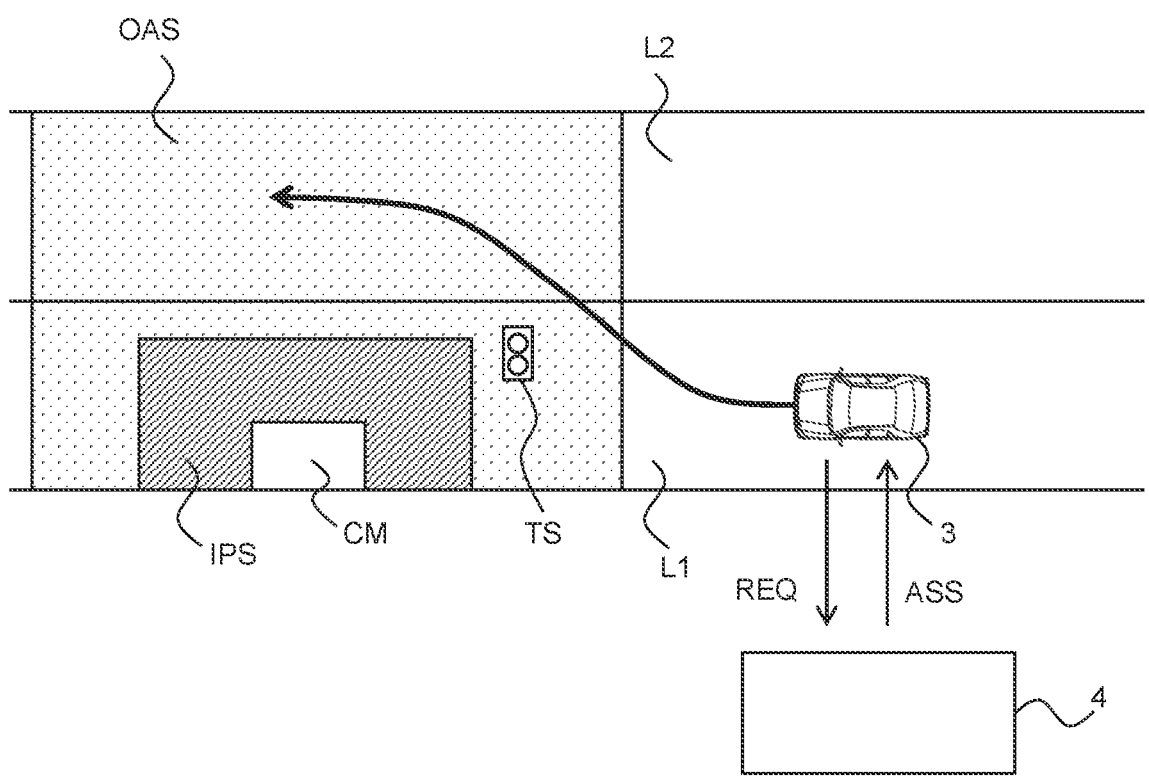
FIG. 2 is a diagram for explaining the outline of the embodiment of present disclosure.
Figure 3:
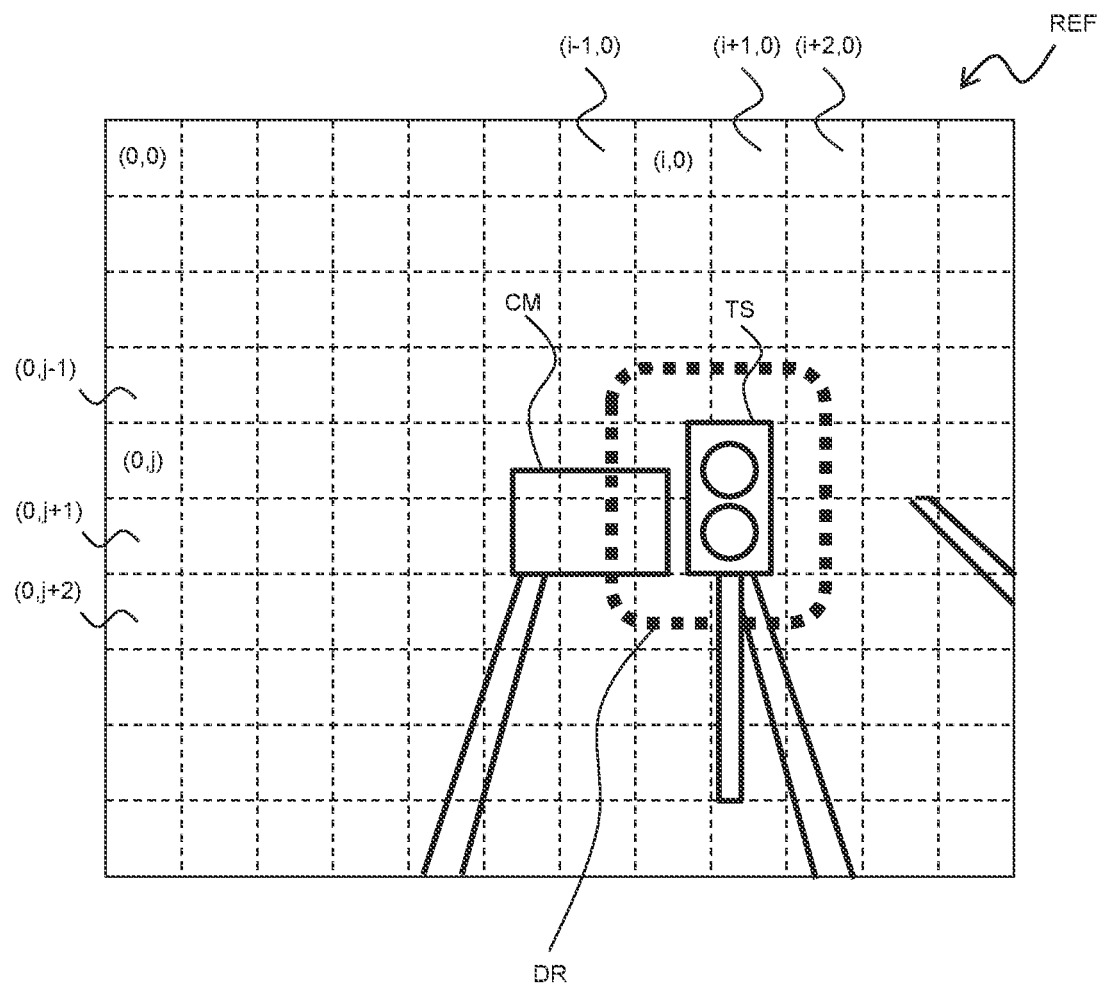
FIG. 3 is a diagram for explaining the outline of the embodiment of present disclosure.

FIGS. 1 to 3 are diagrams for explaining an outline of the embodiment. FIGS. 1 and 2 depict an automated drive vehicle 3 traveling on a lane L1. The automated drive vehicle 3 constitutes a part of the remote assist system of vehicles according to the embodiment. In front of the automated drive vehicle 3, there is a construction machine CM. The area around construction machine CM constitutes a section IPS (impassable section) thorough which no vehicle is allowed to pass. That is, in the examples shown in FIGS. 1 and 2, the section IPS as a construction section is set. Note that the examples of the section IPS is not limited to this. For example, the section IPS may be set in an area around a stopping vehicle (e.g., a disabled vehicle).

A lane L2, which is adjacent to the lane L1, is a road for vehicles that come from an opposite direction to the automated drive vehicle 3. There is no construction between the lanes L1 and L2, such as a central separating zone. Therefore, the lanes L1 and L2 constitute a two-way road having one lane for each side. When the section IPS is set in the two-way road, an area around the section IPS may constitute a section OAS (one-side alternate section) that allows an alternating passage of vehicles. The section OAS includes areas in front of and behind the section IPS in the lane L1, an area in the lane L2 adjacent to the section IPS, and areas in front of and behind the adjacent area.

A traffic light TS is installed in front of the section IPS in the lane L1. The traffic light TS is a provisional traffic light for vehicles (e.g., the automated drive vehicle 3) traveling on the lane L1 to pass through the section OAS. The traffic light TS includes lighting parts (e.g. blue and red lighting parts). A lighting state of the lighting parts is switched at predetermined intervals. The traffic light TS may include a display part that indicates a time until the lighting state is switched.

In FIG. 1, the automated drive vehicle 3 is decelerating in front of the section OAS. Examples of cases where the automated drive vehicle 3 performs deceleration includes a case in which an instruction content of the lighting parts is "stop" (specifically, the red lighting part is lit). Another example is a case in which a recognition accuracy of the traffic light TS, the lighting parts or the lighting state by the automated drive vehicle 3 is low, including a case in which the automated drive vehicle 3 cannot recognize the traffic light TS or the like. If the recognition accuracy of the traffic light TS or the like is low, the automated drive vehicle 3 temporally stop in front of the section OAS.

In FIG. 2, the automated drive vehicle 3 that temporally stops in front of the section OAS is depicted. If the recognition accuracy of the traffic light TS or the like is low, for example, the automated drive vehicle 3 transmits a signal (an assist requiring signal) REQ to a remote facility 4 for requesting an assistance to pass through the section OAS after the automated drive vehicle 3 has completed the stopping operation (or during an execution of the deceleration operation). An operator residing in the remote facility 4 performs this assistance in response to the assist requiring signal REQ. When transmitting the assist requiring signal REQ, front shot image information of the automated drive vehicle 3 while the automated drive vehicle 3 is stopped is transmitted as the "reference image information REF".

FIG. 3 is a diagram schematically showing a part of the reference image information REF. The reference image information REF shown in FIG. 3 is displayed in the remote facility 4 in order to monitor by the operator. The operator who monitors the reference image information REF recognizes the traffic light TS. The operator who recognizes the traffic light TS transmits assist information ASS including positional information PPS of pixels constituting the traffic light TS to the automated drive vehicle 3. The positional information PPS of the pixels is used to improve the recognition accuracy of the traffic light TS or the like by the automated drive vehicle 3.

The reference image information REF is composed of a plurality of pixels. In the example shown in FIG. 3, an area of interest DR is set to surround the traffic light TS. The area of interest DR is an area specified by the operator who monitors the reference image information REF. The area of interest DR is a rectangle area having coordinates (i−1, j−1), (i+2, j−1), (i−1, j+2) and (i+2, j+2) as its vertices, and coordinate information constituting this area of interest DR corresponds to the positional information PPS.

The automated drive vehicle 3 that receives the assist information ASS including the positional information PPS determines whether or not a passage permit condition for automatically passing through the section OAS is satisfied in accordance with the instruction content of the traffic light TS based on the positional information PPS and the shot image information. The passage permit condition includes, for example, the following conditions:

(i) The traffic light TS is recognized; and
(ii) The instruction content of the lighting parts is "passage permit" (specifically, the blue lighting part is lit).
If it is determined that the passage permit condition is satisfied, the automated drive vehicle 3 releases a state of the temporal stop and starts moving to pass through the section OAS automatically.

When the instruction content of the lighting parts is "passage permit", the operator who has recognized the traffic light TS may transmit a passage permitting signal STA to the automated drive vehicle 3. In this case, the passage permitting signal STA is transmitted to the automated drive vehicle 3 as additional assist information ASS. When receiving the passage permitting signal STA, the automated drive vehicle 3 determines, after the receipt of this passage permit condition, whether or not the passage permit condition is satisfied. If it is determined that the passage permit condition is satisfied, the automated drive vehicle 3 releases the state of the temporal stop and starts moving to pass through the section OAS automatically. That is, if it is determined that the passage permit condition is satisfied after the receipt of the passage permitting signal STA, the automated drive vehicle 3 automatically passes through section OAS.

As described above, according to the embodiment, when the recognition accuracy of the traffic light TS or the like is low, the assistance of the passage in the traffic in section OAS is performed by the operator. In this assistance, the assist information ASS containing the positional information PPS is provided to the automated drive vehicle 3 by the operator who has monitored the reference image information REF. According to the positional information PPS, the recognition accuracy of the traffic light TS or the like by the automated drive vehicle 3 is improved. Therefore, it is possible for the automated drive vehicle 3 to determine whether or not the passage permit condition is satisfied.

If only the passage permitting signal STA is provided to the automated drive vehicle 3, a time lag that occurs when sending and receiving this passage permitting signal STA becomes a problem. In particular, when a communication delay occurs, the time lag increases. Specifically, there is a possibility that the instruction content of the lighting parts is changed from "passage permit" to "stop" when the automated drive vehicle 3 starts moving. In this respect, according to the determination of the passage permit condition based on the positional information PPS, real-time information indicated by the traffic light TS can be considered. Therefore, it is possible to improve the safety of the automated drive vehicle 3 when automatically passing through the section OAS according to the instruction content of the traffic light TS.

In FIGS. 1 to 3, examples in which the traffic light TS is installed in the section OAS are described. However, the traffic light TS to which the embodiment is applied includes a traffic light installed in a private property (hereinafter also referred to as a "private traffic light"). The private traffic light is a security appliance that is installed in a specific area (e.g., a crossing point or an interfluent point of roads) within the private property. Typical installation points of the private traffic light are assumed to be on a side of the specific area or above the specific area. The outline of the embodiment applied to the private traffic light is described by replacing the "section OAS" in the descriptions of FIGS. 1 to 3 with the "specific area".

Hereinafter, the remote assist system of the vehicles according to the embodiment will be described in detail.

2. Configuration Example of Remote Assist System

2-1. Whole Configuration Example

Figure 4:
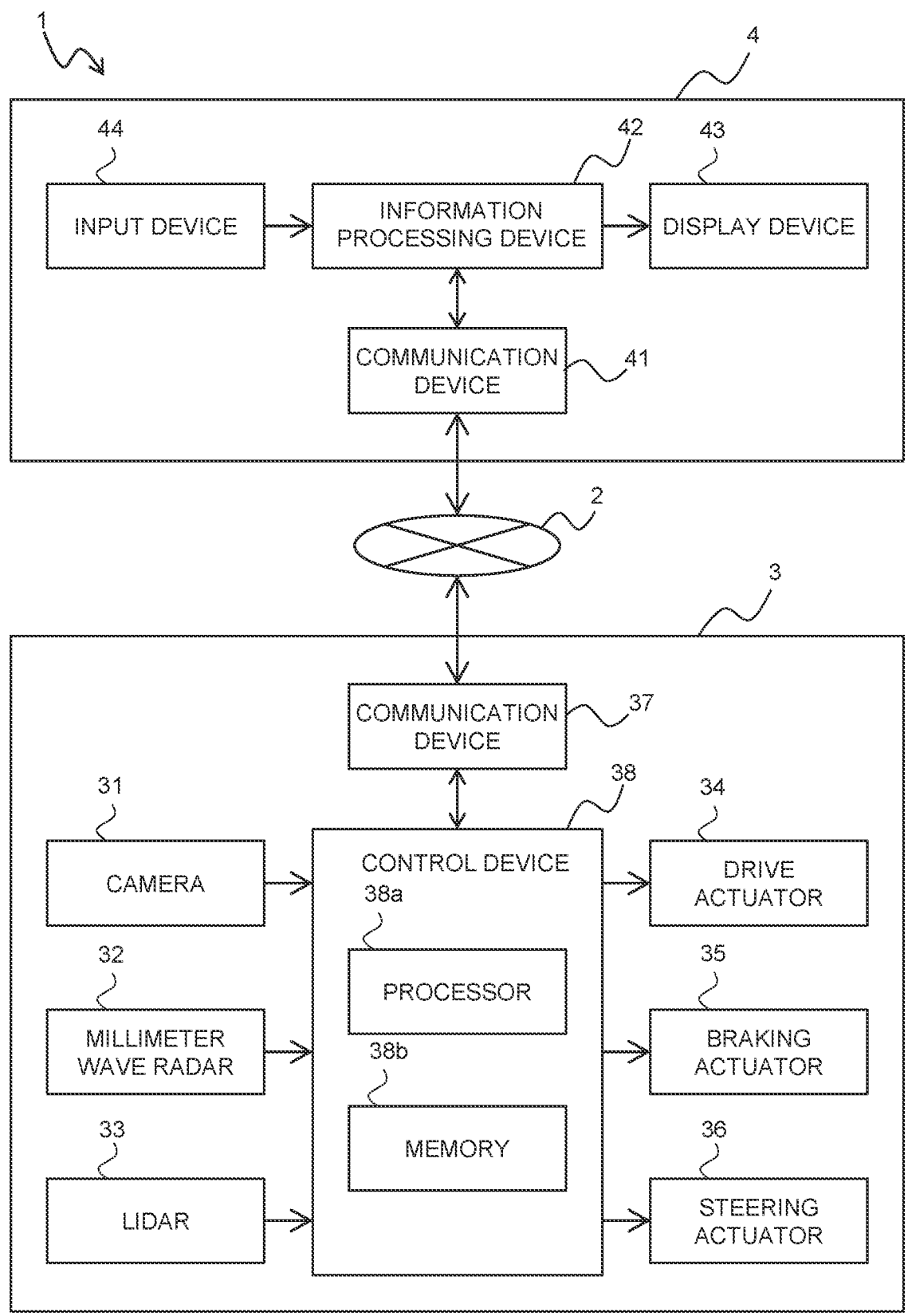
FIG. 4 is a diagram showing a configuration example of a remote assist system according to the embodiment of present disclosure.

The remote assist system of the vehicles according to the present embodiment is a system in which the automated drive vehicle 3 and the remote facility 4 are connected to each other via a network. FIG. 4 is a diagram showing a configuration example of the remote assist system 1 according to the embodiment.

The remote assist system 1 includes the automated drive vehicle 3 and the remote facility 4 that communicates the automated drive vehicle 3 via a network (i.e., an Internet) 2. An operating condition of the automated drive vehicle 3 is monitored by the remote facility 4. The remote facility 4 may monitor one of the automated drive vehicle 3 exclusively, or may monitor a plurality of the automated drive vehicles 3 at the same time.

In the remote facility 4, the operator monitors the operating condition of the automated drive vehicle 3. To realize the monitoring by the operator, the remote facility 4 includes a communication device (a facility side communication device) 41, an information processing device 42, a display device 43, and an input device 44.

The communication device 41 is a device for receiving shot image information from the automated drive vehicle 3. The information processing device 42 is constituted by a microcomputer including at least one processor and at least one memory. The information processing device 42 executes display control processing as processing to process the shot image information and display on the display device 43. The input device 44 is an HMI (Human Machine Interface) for the operator to enter instructions to the information processing device 42. When an instruction is entered from the operator, the information processing device 42 executes input information processing to process this input information. The communication device 41 transmits some or all of the information after the input information processing by the information processing device 42 to the automated drive vehicle 3.

The automated drive vehicle 3 includes a camera 31, a millimeter wave radar 32, and a LIDAR 33 as devices for acquiring driving environment information for the automated driving. The camera 31 is a device for acquiring the shot image information on the automated drive vehicle 3 and is indispensable for the automated drive vehicle 3. The millimeter wave radar 32 and LIDAR 33 are devices for acquiring object information around the automated drive vehicle 3. The millimeter wave radar 32 and LIDAR 33 may be omitted. The camera 31 is attached to, for example, a windshield of the automated drive vehicle 3. The information acquired by the camera 31, millimeter wave radar 32 and LIDAR 33 is transmitted to the controller 38.

The controller 38 captures driving environment information including information from the camera 31, millimeter wave radar 32 and LIDAR 33, and the assist information from the remote facility 4. Then, the controller 38 operates various actuators by manipulated signals obtained by the processing the information mentioned above. The various actuators include a drive actuator 34, a braking actuator 35 and a steering actuator 36. The drive actuator 34 drives the automated drive vehicle 3. The braking actuator 35 applies a braking force to the automated drive vehicle 3. The steering actuator 36 steers the automated drive vehicle 3.

The driving environment information includes information relating to vehicle state acquired by the vehicle-mounted sensors such as a vehicle speed sensor, an acceleration sensor, and the like (not shown). The driving environment information further includes positional information indicating the current position of the automated drive vehicle 3 acquired by a GPS receiver (not shown) and map information stored in a map database. The assist information from the remote facility 4 is obtained by wireless communication by a communication device (a vehicle side communication device) 37. As a communication standard of the wireless communication used by the communication device 37, mobile communication standards such as 4G, LTE, and 5G are exemplified.

The controller 38 is constituted by a microcomputer including at least one processor 38a and at least one memory 38b. At least one program for the automated driving is stored in the memory 38b. Various kinds of information including the driving environment information are stored in the memory 38b. Programs stored in the memory 38b is read and executed by the processor 38a to realize various functions of the controller 38.

2-2. Functional Example of Controller

2-2-1. Automated Driving Control Function

The controller 38 (the processor 38a) calculates a traveling route of the automated drive vehicle 3 based on, for example, the positional information of automated drive vehicle 3 and the map information. And the controller 38 executes automated driving control in which the driving, steering and braking of the automated drive vehicle 3 is controlled such that the automated drive vehicle 3 travels along the calculated traveling route. In executing the automated driving control, the shot image information from the camera 31, the object information from the millimeter wave radar 32 and LIDAR 33 and the vehicle status information from the in-vehicle sensors are used as appropriate. Note that there are various known methods for automated driving, and the method is not limited to the present disclosure method. Accordingly, description of the method for the automated driving along the traveling route will be omitted herein.

The automated driving control includes collision avoidance control. The collision avoidance control is vehicle control to prevent the automated drive vehicle 3 from colliding with a surrounding object (an avoidance target). Examples of the avoidance target include the construction machine CM shown in FIG. 1. Image processing techniques using artificial intelligence are used to recognize the surrounding object (the avoidance target). When security devices such as a triangle cone is recognized from the shot image information (or integrated information of the shot image information and the object information), the controller 38 recognizes an area separated by the security devices as the section IPS. When the section IPS is recognized, the controller 38 executes the collision avoidance control in which the section IPS is recognized as the avoidance target.

In the execution of the collision avoidance control using the section IPS as the avoidance target, the controller 38 determines whether or not the area around section IPS corresponds to the section OAS based on the shot image information, positional information and map information. For example, according to the positional information and map information, it can be understood that the automated drive vehicle 3 is traveling the two-way road having one lane for each side. Further, according to the shot image information, a ratio occupied by the section IPS in a lane width direction can be calculated. Therefore, it is determined whether or not the occupation ratio of the section IPS is equal to or greater than a threshold. Thereby, it can be determined whether or not the area around the section IPS corresponds to the section OAS.

When the traffic light TS is recognized from the shot image information or the integrated data, the determination based on the occupation ratio of the section IPS may be omitted. The traffic light TS is a typical security device place in the section OAS. Therefore, when the traffic light TS is recognized, it can be easily determined that the area around the section IPS corresponds to the section OAS.

If it is determined that there is the section OAS in front of the automated drive vehicle 3, the controller 38 determines, based on the shot image information, whether or not the passage permit condition to automatically pass through section OAS is satisfied. The passage permit condition includes, for example, the following conditions:
 (i) The traffic light TS is recognized; and
 (ii) The instruction content of the lighting parts corresponds to "passage permit"

If it is determined that the passage permit condition is satisfied, the automated drive vehicle 3 automatically passes through the section OAS. During the automatic passage through the section OAS, for example, a traveling route (a target trajectory) from an actual position of the automated drive vehicle 3 to any one position in the section OAS is set. The controller 38 controls the driving, steering, and braking of the automated drive vehicle 3 such that the automated drive vehicle 3 travels along the set target trajectory. After passing through the section IPS, the controller 38 sets the target trajectory from the actual position of the automated drive vehicle 3 to any one position in the lane L1. The controller 38 controls the driving, steering, and braking of the automated drive vehicle 3 such that the automated drive vehicle 3 travels along the set target trajectory.

If it is determined that passage permit condition is not satisfied, the controller 38 (the processor 38a) controls the driving, steering and braking of the automated drive vehicle 3 such that the automated drive vehicle 3 stops in front of the section OAS. The controller 38 then transmits the assist requiring signal REQ to the remote facility 4. The assist requiring signal REQ is transmitted after the completion of the stopping operation of the automated drive vehicle 3. The transmission of the assist requiring signal REQ may occur prior to the completion of the stopping operation. That is, the assist requiring signal REQ may be transmitted during the deceleration operation of the automated drive vehicle 3.

2-2-2. Shot Image Transmitting Function

The controller 38 (the processor 38a) transmits the shot image information from the camera 31 to the remote facility 4. The shot image information to be transmitted includes at least front shot image information of the automated drive vehicle 3. The shot image information transmitted during the automated drive vehicle 3 stops in front of the traffic light TS is the reference image information REF. The reference image information REF is transmitted to the remote facility 4 and stored in a predetermined area of the memory 38b (or a cache memory of the processor 38a).

The controller 38 transmits the shot image information according to communication cycles between the remote facility 4 and the communication device 37. The shot image information transmitted to the remote facility 4 is used for remote monitoring around the automated drive vehicle 3. The communication cycles may be fixed or may vary as the driving environment information. For example, the communication cycle during the automated drive vehicle 3 travels along a vehicle-only lane may be lengthened, and the communication cycle during it travels across an intersection where a traffic light exists may be shortened. The communication cycle when the automated drive vehicle 3 stops in front of the traffic light TS can be, for example, an intermediate between these two communication cycles.

3. Processing Example when Section IPS is Set for Two-Way Road 3-1. Processing in Automated Drive Vehicle (Controller)

Figure 5:
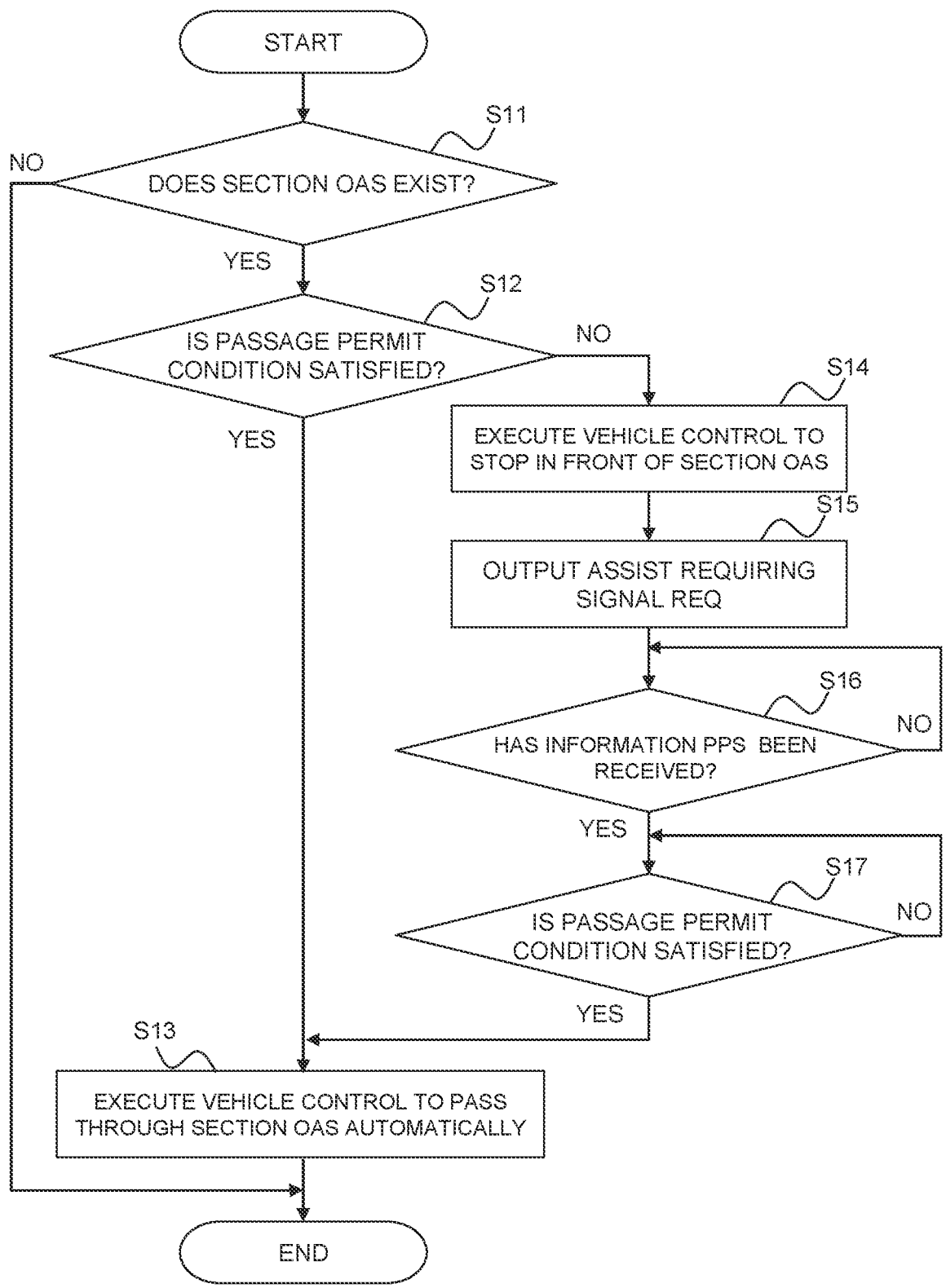
FIG. 5 is a flow chart showing a flow of automated driving control processing executed by an automated drive vehicle when an impassable section is recognized.

FIG. 5 is a flow chart showing a flow of automated driving control processing executed by the controller 38 when the section IPS is recognized. The routine shown in FIG. 5 is executed repeatedly each time the section IPS is recognized.

In the routine shown in FIG. 5, first, it is determined whether or not the section OAS exist in front of the automated drive vehicle 3 (step S11). Whether or not the section OAS exist is determined based on the shot image information, positional information and map information. For example, the controller 38 determines, based on the positional information and map information, whether or not the automated drive vehicle 3 is traveling on one side of the two-way road having one lane for each side. The controller 38 also calculates a ratio occupied by the section IPS in the lane width direction based on the shot image information. Then, the controller 38 determines whether or not the occupation ratio is equal to or greater than a threshold. When the occupation ratio is equal to or larger than the threshold, it is determined that section OAS exists.

If the determination result in the step S11 is negative, the processing of this routine is ended. In this case, the controller 38 executes the collision avoidance control in which the section IPS is treated as the avoidance target in accordance with a control program different from the present routine. If the determination result in the step S11 is positive, based on the shot image information, it is determined whether or not the passage permit condition is satisfied (step S12). Examples of the passage permit condition is as described above.

If the determination result in the step S12 is positive, vehicle control is executed to pass through the section OAS automatically (step S13). For example, the controller 38 sets the target trajectory from the actual position of the automated drive vehicle 3 to any one position within the section OAS. The controller 38 then controls the driving, steering and braking of the automated drive vehicle 3 such that the automated drive vehicle 3 travels along the set target trajectory. After passing through the section IPS, the controller 38 sets another target trajectory from the actual position of the automated drive vehicle 3 to any one position within the lane L1. And the controller 38 controls the driving, steering, and braking of the automated drive vehicle 3 such that the automated drive vehicle 3 travels along the another target trajectory.

If the determination result in the step S12 is negative, vehicle control is executed to stop the automated drive vehicle 3 in front of the section OAS (step S14). For example, the controller 38 controls the driving, steering and braking of the automated drive vehicle 3 such that the automated drive vehicle 3 keeps stopping in front of the section OAS.

Subsequent to the processing of the step S14, the assist requiring signal REQ is outputted (step S15). The assist requiring signal REQ is transmitted from the controller 38 to the communication device 37. The assist requiring signal REQ is then transmitted over the network 2 to the communication device 41.

Subsequent to the processing of the step S15, it is determined whether or not the assist information ASS including the positional information PPS has been received (step S16). As described above, the positional information PPS is the positional information of the pixels that make up the traffic light TS included in the reference image information REF (see FIG. 3). The processing of the step S16 is repeatedly executed until a positive determination result is obtained.

If the determination result in the step S16 is positive, it is determined whether or not the passage permit condition is satisfied (step S17). That is, when receiving the positional information PPS, the controller 38 determines again whether or not the passage permit condition is satisfied. The content of the processing in the step S17 is basically the same as that in the step S12. However, while the determination in the step S12 is executed based on the shot image information, the determination in the step S17 is executed based on the positional information PPS and the shot image information.

As described above, the positional information PPS is the positional information of the pixels that make up traffic light TS. That is, the positional information PPS is information indicating where the traffic light TS is located in the pixel coordinate of the reference image information REF. Here, since the automated drive vehicle 3 stops temporally, the pixel coordinate of the traffic light TS in the shot image information acquired during this period is the same as that in the reference image information REF. Therefore, according to the positional information PPS, the recognition accuracy of the traffic light TS by the controller 38 can be increased. Therefore, the first condition (i) of the passage permit condition is easily satisfied.

If the first condition (i) and second condition (ii) of the passage permit condition is satisfied at the same time, it is determined that passage permit condition is satisfied. If the determination result of the step S17 is positive, the processing of the step S13 is executed. That is, the controller 38 executes vehicle control in which the automated drive vehicle 3 starts from the stopping position in front of the section OAS and automatically passes through the section OAS.

Figure 6:
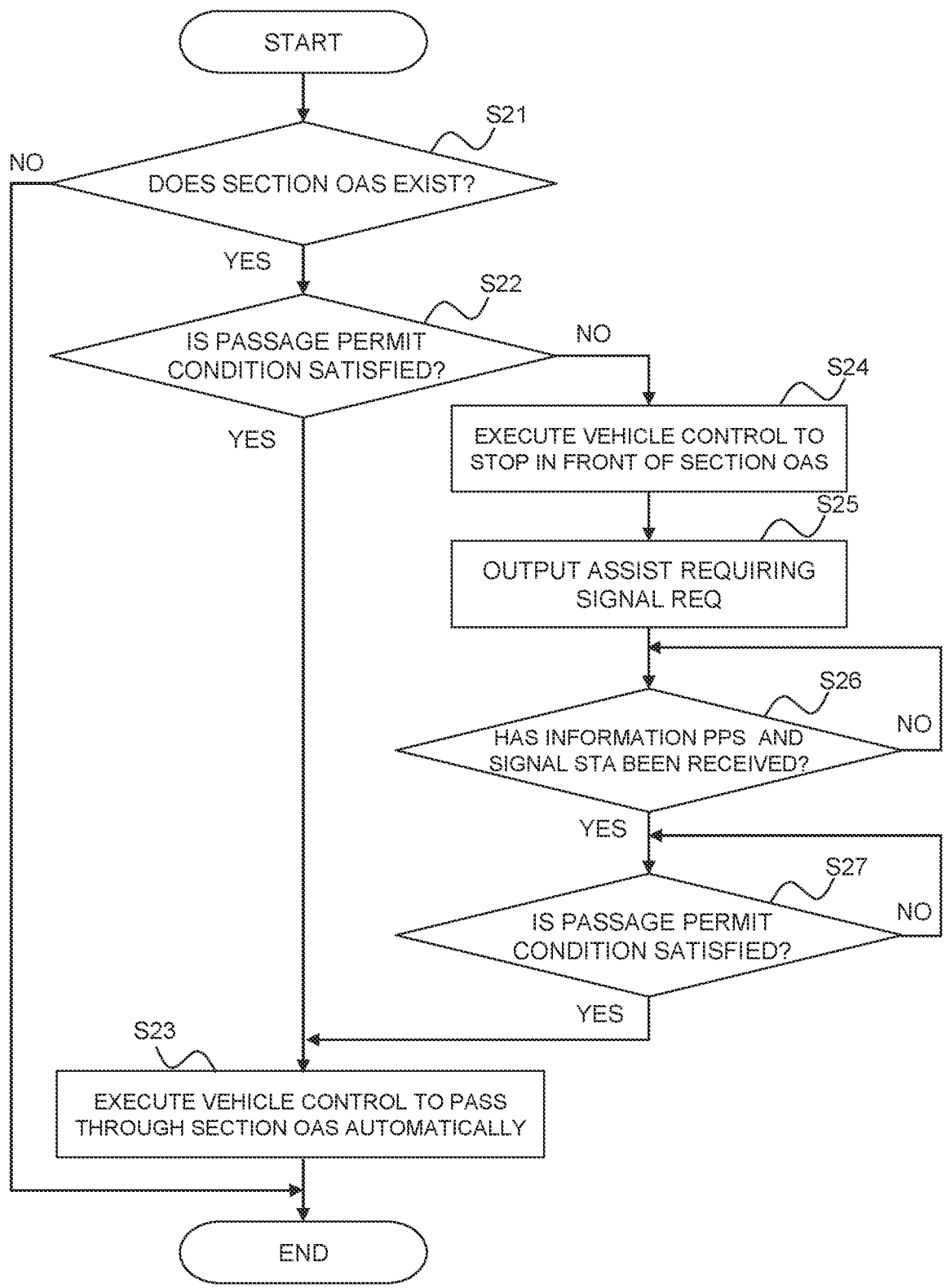
FIG. 6 is a flow chart showing a flow of another automated driving control processing executed by the automated drive vehicle when the impassable section is recognized.

FIG. 6 is a flow chart showing a flow of another automated driving control processing executed by the controller 38 when the section IPS is recognized. The routine shown in FIG. 6, like the routine shown in FIG. 5, is executed repeatedly each time the section IPS is recognized.

The processing from steps S21 to S25 shown in FIG. 6 is the same as that from the steps S11 to S15 described in FIG. 5. Therefore, the processing after the step S26 will be described below.

Subsequent to the processing of the step S25, it is determined whether or not the assist information ASS including the positional information PPS and the passage permitting signal STA has been received (step S26). The reception determination of the positional information PPS is as described in the step S16 in FIG. 5. The passage permitting signal STA is a signal for permitting the automated drive vehicle 3 to start. The processing of the step S26 is repeatedly executed until a positive determination result is obtained.

If the determination result of the step S26 is positive, it is determined whether or not the passage permit condition is satisfied (step S27). The content of the processing of the step S27 is basically the same as that of the step S17 in FIG. 5. However, in the processing of the step S27, after receiving the passage permitting signal STA, the determination is executed based on the positional information PPS and shot image information.

If the determination result in the step S27 is positive, the processing in the step S23 is executed. That is, controller 38 starts from the stopping position in front of section OAS, and performs vehicle control for automatically passing through section OAS.

3-2. Processing in Remote Facility (Information Processing Device)

Figure 7:
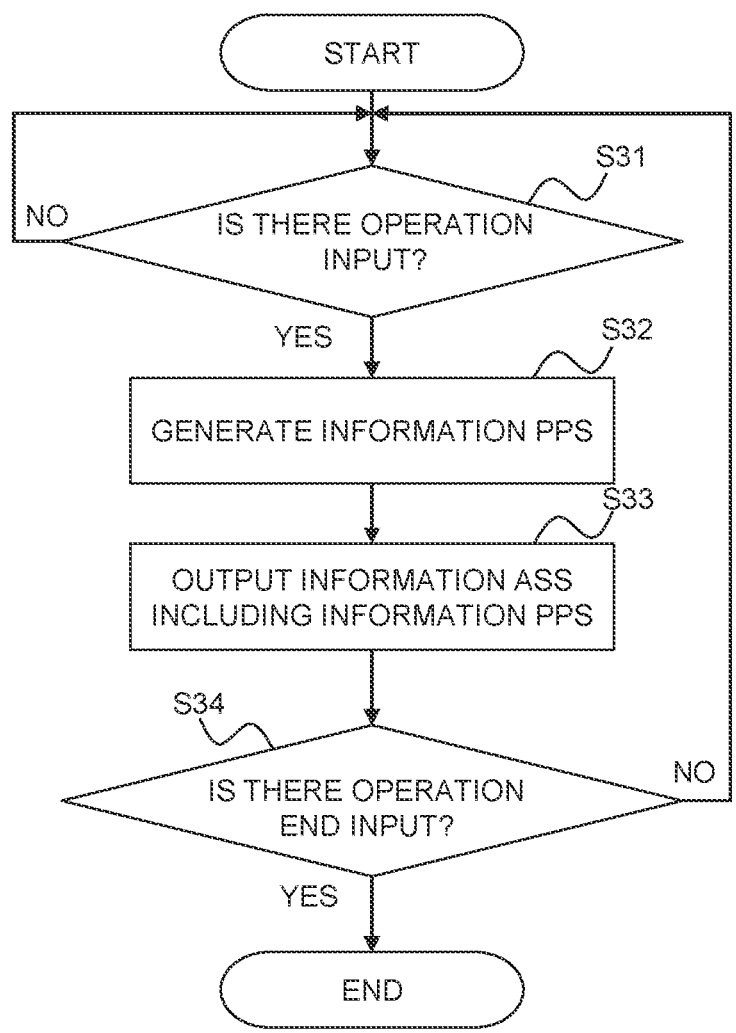
FIG. 7 is a flow chart showing a flow of information processing executed by a remote facility.

FIG. 7 is a flowchart showing a flow of the input information processing executed by the information processing device 42 when the operator performs the remote assist in response to the assist requiring signal REQ. The routine shown in FIG. 7 is executed repeatedly each time the information processing device 42 receives the assist requiring signal REQ.

In the routine shown in FIG. 7, first, it is determined whether or not there is an operation input by the operator (Step S31). The operator who performs the remote assist recognizes the traffic light TS based on the reference image information REF displayed on the display device 43. Note that the reference image information REF is displayed based on the display control processing. The operator who recognizes the traffic light TS operates the input device 44 to designate an area of interest DR so as to surround the traffic light TS. The processing in the step S31 is repeatedly executed until a positive step of the determination result is obtained.

If the determination result in the step S31 is positive, the positional information PPS is generated (step S32). The information processing device 42 generates coordinate information of pixels (i.e., positional information PPS) constituting the traffic light TS based on the area specification by the operator.

Subsequent to the processing in the step S32, the assist information ASS including the positional information PPS is outputted (step S33). This assist information ASS is transmitted from the information processing device 42 to the communication device 41. The assist information ASS is then transmitted over the network 2 to the communication device 37.

The operator who performs the remote assist may recognize that the instruction content of the lighting parts corresponds to "passage permit". The operator may then operate the input device 44 to enter the passage permitting signal STA. If the passage permitting signal STA is entered, the information processing device 42 adds it to the assist information ASS.

Subsequent to the step S33, it is determined whether or not there is an operation end input by the operator (step S34). The operator who performs the remote assist recognizes the start moving of the automated drive vehicle 3 or confirms the passing through the section OAS of the automated drive vehicle 3 based on the shot image information displayed on the display device 43. Alternatively, the operator who performs the remote assist recognizes that the reception of the assist requiring signal REQ is completed. In either case, the operator operates the input device 44 and enters a command to end the remote assist in response to the assist requiring signal REQ. The processing of the step S34 is repeatedly executed until a positive step of the determination result is obtained.

4. Effect

According to the remote assist system of the present embodiment described above, even when the recognition accuracy of the traffic light TS or the like is low, the assist information ASS including the positional information PPS is provided in response to the assist requiring signal REQ from the remote facility 4 to the automated drive vehicle 3. Therefore, it is possible to improve the situation in which the recognition accuracy of the traffic light TS or the like is low. Therefore, it is possible for the automated drive vehicle 3 to recognize real-time information indicated by the traffic light TS and to determine the passage permit condition. Therefore, it is possible to improve the safety of the automated drive vehicle 3 when automatically passing through the section OAS.

What is claimed is:

1. A remote assist system of vehicles, comprising:
a vehicle configured to perform an automated driving; and
a remote facility configured to communicate with the vehicle,
wherein the vehicle comprises a controller configured to execute automated driving control of the vehicle based on driving environment information including shot image information in front of the vehicle,
wherein the remote facility comprises:
an input device which is operated by an operator;
a display device configured to display the shot image information
an information processing device configured to execute input information processing to process input information received by the input device, and display control processing of the display device,
wherein, in the automated driving control, the controller is configured to:
determine, based on the driving environment information, whether or not a passage permit condition of the vehicle according to an instruction content of a traffic light that exists in front of the vehicle is satisfied;
if it is determined that the passage permit condition is not satisfied, execute vehicle control to stop the vehicle temporally in front of the traffic light; and
transmit an assist requesting signal for requesting an assist by the operator to the remote facility,
wherein, the information processing device is configured to:
when receiving the assist requiring signal, execute processing to display reference image information indicating the shot image information during the temporal stop of the vehicle; and
when receiving, as the input information, positional information of pixels constituting the traffic light included in the reference image information, transmit to the vehicle assist information including the positional information in the input information processing,
wherein, in the automated driving control, the controller is further configured to:
when receiving the assist information, determine whether or not the passage permit condition of the vehicle based on the received assist information; and
if it is determined that the passage permit condition is satisfied, execute vehicle control in which the temporarily stop of the vehicle is released and the vehicle is controlled to travel in accordance with the instruction content of the traffic light.

2. The remote assist system of vehicles according to claim 1,
wherein, the information processing device is configured to, when receiving as the input information the passage permitting signal of the vehicle, transmit to the vehicle the assist information including the passage permitting signal,
wherein, in the automated driving control, the controller is further configured to:
if it is determined that the passage permit condition is satisfied after receiving the passage permitting signal, execute the vehicle control in which the temporarily stop of the vehicle is released and the vehicle is controlled to travel in accordance with the instruction content of the traffic light.

3. A remote assist method of vehicles in which automated driving of the vehicles is remotely assisted, the method comprising the steps of:
executing, by a controller of a vehicle, automated driving control of the vehicle based on driving environment information including shot image information in front of the vehicle; and
executing, by an information processing device of a remote facility configured to communicate with the vehicle, input information processing to process input information received by the input device and executes display control processing of a display device to display the shot image information thereon,
wherein, in the automated driving control, the controller is configured to:
determine, based on the driving environment information, whether or not a passage permit condition of the vehicle according to an instruction content of a traffic light that exists in front of the vehicle is satisfied;
if it is determined that the passage permit condition is not satisfied, execute vehicle control to stop the vehicle temporally in front of the traffic light; and
transmit an assist requesting signal for requesting an assist by the operator to the remote facility,
wherein, the information processing device is configured to:
when receiving the assist requiring signal, execute processing to display reference image information indicating the shot image information during the temporal stop of the vehicle; and
when receiving, as the input information, positional information of pixels constituting the traffic light included in the reference image information, transmit to the vehicle assist information including the positional information in the input information processing,
wherein, in the automated driving control, the controller is further configured to:
when receiving the assist information, determine whether or not the passage permit condition of the vehicle based on the received assist information; and if it is determined that the passage permit condition is satisfied, execute vehicle control in which the temporarily stop of the vehicle is released and the vehicle is controlled to travel in accordance with the instruction content of the traffic light.

4. The remote assist method of vehicles according to claim 3, wherein, the information processing device is configured to, when receiving as the input information the passage permitting signal of the vehicle, transmit to the vehicle the assist information including the passage permitting signal, wherein, in the automated driving control, the controller is further configured to:

if it is determined that the passage permit condition is satisfied after receiving the passage permitting signal, execute the vehicle control in which the temporarily stop of the vehicle is released and the vehicle is controlled to travel in accordance with the instruction content of the traffic light.

* * * * *